United States Patent [19]
Torii et al.

[11] Patent Number: 5,749,347
[45] Date of Patent: May 12, 1998

[54] FUEL LEAKAGE PREVENTION SYSTEM HAVING LATCH-ENGAGED VALVE

[75] Inventors: Mikio Torii, Hekinan; Seiji Tanizawa, Aichi-gun, both of Japan

[73] Assignee: Denso Corporation, Kariya, Japan

[21] Appl. No.: 901,267

[22] Filed: Jul. 28, 1997

[30] Foreign Application Priority Data

Jul. 30, 1996 [JP] Japan ................................. 8-199947

[51] Int. Cl.⁶ ........................................... F02M 37/04
[52] U.S. Cl. ............................. 123/516; 137/43; 137/565; 123/520; 123/509
[58] Field of Search ................................ 123/516, 520, 123/519, 518, 521, 509; 137/43, 565

[56] References Cited

U.S. PATENT DOCUMENTS

| | | | |
|---|---|---|---|
| 4,023,583 | 5/1977 | Parkiyuson | 137/43 |
| 4,351,350 | 9/1982 | Crute | 137/43 |
| 4,646,772 | 3/1987 | Bergsma | 137/43 |
| 4,655,238 | 4/1987 | Szliaga | 137/43 |
| 4,679,581 | 7/1987 | Mears | 137/43 |
| 4,742,840 | 5/1988 | Takahashi | 137/43 |
| 4,753,262 | 6/1988 | Bergsma | 137/43 |
| 5,261,439 | 11/1993 | Harris | 123/516 |
| 5,551,405 | 9/1996 | Thompson | 123/516 |
| 5,568,823 | 10/1996 | Tateishi | 137/43 |
| 5,598,870 | 2/1997 | Nagino | 123/518 |

FOREIGN PATENT DOCUMENTS 7-172193 of 0000 Japan.

*Primary Examiner*—Carl S. Miller
*Attorney, Agent, or Firm*—Nixon & Vanderhye P.C.

[57] ABSTRACT

A cylindrical housing including a float-type valve is latch-engaged in an installation wall in a fuel tank. The cylindrical housing has an annular groove on its entire outer circumference, while the installation wall has a plurality of resilient tongues each of which has an inwardly protruding convex. With the latch-engagement between the resilient tongues and the annular groove being provided radially outside the housing, the float-type valve is enabled to move in the cylindrical housing without interruption by the resilient tongues. A turn preventing mechanism is provided between the cylindrical housing and the installation wall at the upper parts thereof located outside the fuel tank.

13 Claims, 5 Drawing Sheets

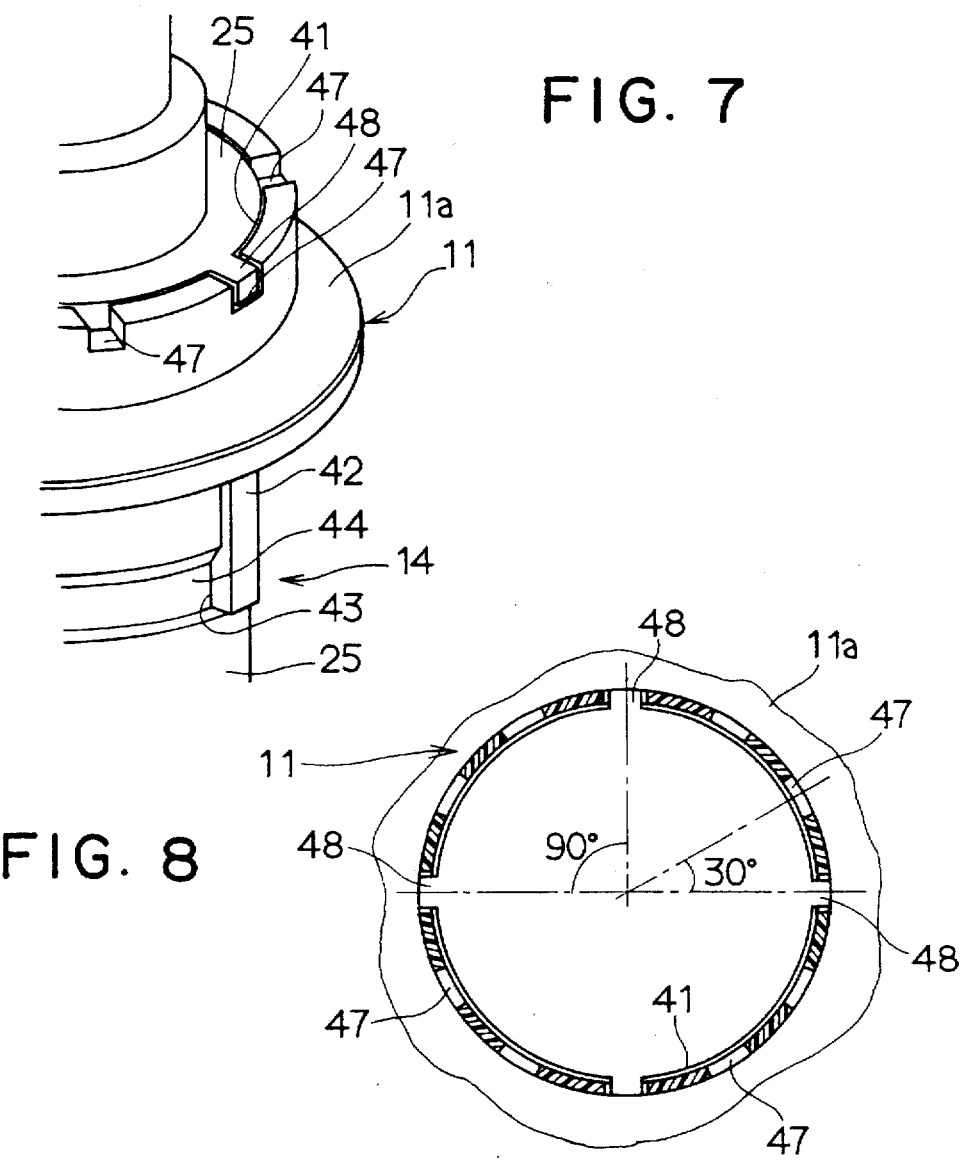
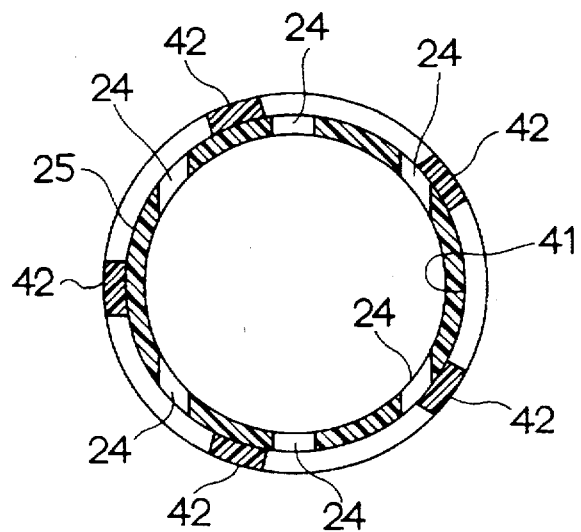
FIG. 7
FIG. 8
FIG. 9

FUEL LEAKAGE PREVENTION SYSTEM HAVING LATCH-ENGAGED VALVE

CROSS REFERENCE TO RELATED APPLICATION

This application is based on and claims priority of Japanese Patent Application No. 8-199947 filed on Jul. 30, 1996, the contents of which are incorporated herein by reference.

BACKGROUND OF THE INVENTION

1. Field of the Invention

The present invention relates to a fuel leakage prevention system for preventing fuel leakage by closing an evaporation gas releasing passage disposed between a fuel tank and a canister by a float-type valve upon rolling over of a vehicle.

2. Description of Related Art

Generally, a canister for receiving evaporation gas (fuel evaporation gas) generated in a fuel tank is provided on a vehicle having a gasoline engine. The canister communicates with the fuel tank through an evaporation gas releasing passage. The canister is provided with an air communication hole for receiving outside ambient air, so that the evaporation gas adsorbed in the canister is taken into an air induction system of the engine together with the outside ambient air taken from the air communication hole. A float-type fuel leakage prevention valve unit (a roll-over valve or a cut-off valve) is provided at an inlet portion of the evaporation gas releasing passage in the fuel tank, so that fuel is prevented from leaking through the air communication hole of the canister by closing the inlet portion of the evaporation gas releasing passage by the fuel leakage prevention valve unit when the vehicle rolls over.

Conventionally, this kind of fuel leakage prevention valve unit is fastened to a wall surface of the fuel tank with bolts; however, such an assembling operation as tightening the bolts requires a troublesome work. Japanese Patent Application Laid-Open No. Hei 7-172193 discloses assembling the fuel leakage prevention valve unit by a latch-engagement without using bolts. A plurality of engaging claws are formed by cutting into a U-shape a plurality of portions of the housing of the fuel leakage prevention valve unit. Each engaging claw is resiliently engaged with the peripheral portion of a cylindrical insertion wall defining an installation hole in the fuel tank. Thus, the fuel leakage prevention valve unit can be assembled on the top wall surface of the fuel tank.

At the assembly of the fuel leakage prevention valve unit, because the engaging claws are resiliently deformed toward an inside of the housing at the time of latch-engagement, it is likely to occur that the engaging claws do not perfectly engage or a foreign obstacle is caught between the engaging claw and the installation wall. Thus, the prevention valve unit is likely to be assembled with its engaging claw being kept protruding toward the inside of the housing. In this case, axial or longitudinal movement of the float-type valve received in the housing is interrupted by the engaging claw protruding toward the inside of the housing. As a result, at the roll-over of the vehicle, the float-type valve fails to close the evaporation gas passage and the fuel leakage from the fuel tank through the canister cannot be prevented.

SUMMARY OF THE INVENTION

It is a primary object of the present invention to provide a fuel leakage prevention system which can be assembled with ease and assure a valve closing operation at a roll-over of a vehicle.

It is another object of the present invention to provide a fuel leakage prevention system in which a fuel leakage prevention valve unit can be latched with a wall surface of a fuel tank by engagement claws and a movement of a float-type valve in a housing is not interrupted by the engagement claws.

For attaining the above-described object, in a fuel leakage prevention system according to the present invention, a cylindrical housing receiving a float-type valve therein is made rigid and a cylindrical installation wall of a fuel tank is made resilient. Resilient tongues are provided at a plurality of places on a periphery of the cylindrical installation wall and the rigid housing including the float-type valve is held by the resilient tongues. The resilient tongue has a convex (or concave) on its inner surface, while the cylindrical housing has a concave (or convex) on its outer surface. The cylindrical housing is assembled to the installation wall by resiliently joining the convex and the concave for a latch-engagement therebetween.

Further, communication holes are formed on the housing between the adjacent two of the resilient tongues so that the fuel in the fuel tank can readily flow into the housing upon a rolling over of a vehicle to close a passage communicated with a canister by the float valve.

Preferably, the concave is formed on the entire circumference of the housing so that the convex of each resilient tongue can be joined at any position in the circumferential direction.

Further, a turn preventing mechanism is provided between the installation wall and the housing tank at the top portions of the same at an outside of the fuel tank. The turn preventing mechanism may include a plurality of convexes and concaves so that the housing is engaged with the installation wall at any location in the circumferential direction while preventing the rotational turning after the engagement.

BRIEF DESCRIPTION OF THE DRAWINGS

Additional objects and advantages of the present invention will be more readily apparent from the following detailed description of the preferred embodiment thereof when taken together with the accompanying drawings in which:

FIG. 7 is a partially expanded perspective view illustrating a turn preventing structure in the embodiment;

FIG. 8 is a cross-sectional view illustrating schematically an engagement of a housing with the upper part of a supporting bracket in the embodiment; and FIG. 9 is an cross-sectional view illustrating schematically an engagement of a housing with the lower part of a supporting bracket in the embodiment.

DETAILED DESCRIPTION OF THE PREFERRED EMBODIMENT

The preferred embodiment of the present invention is hereinafter described with reference to the accompanying drawings.

Figure 1:
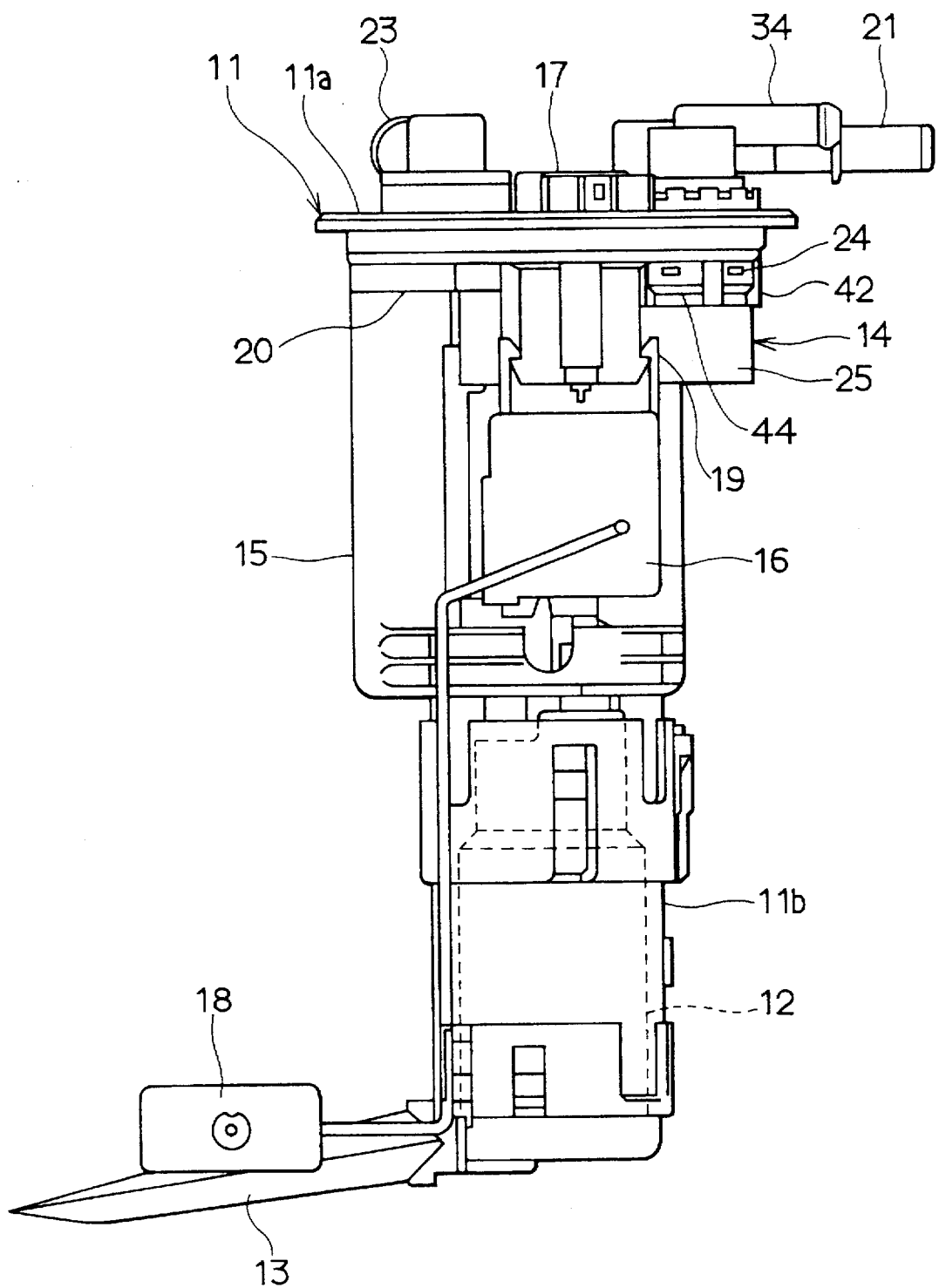
FIG. 1 is a front view illustrating a fuel leakage prevention system according to an embodiment of the present invention.

Referring first to FIG. 1, a supporting bracket 11 which has a flange-like top wall portion 11a to be attached to the top wall of a fuel tank (not shown) has a cylindrical insertion wall 41 including a cylindrical wall portion 11b extending vertically from the top wall portion 11a. The wall portions 11a and 11b are integrally formed. A fuel pump 12 is fixedly assembled to the lower part of the wall portion 11b. The fuel pump 12 is so assembled that its fuel outlet faces upward and a fuel inlet faces downward. A fuel strainer 13 is attached to the fuel inlet for removing foreign obstacles or matters in the fuel.

A fuel leakage prevention valve unit 14, a fuel filter 15 for filtering fuel discharged from the fuel pump 12, a potentiometer-type fuel gauge 16 and an electric connector 17 are assembled to the supporting bracket 11 at a position above the fuel pump 12. The fuel gauge 16 includes a float 18 which moves up and down along with the liquid surface of the fuel in the fuel tank. The fuel amount in the fuel tank is detected in response to the displacement of the float 18 by the potentiometer. The fuel gauge 16 is engaged and fixed at the bottom portion of the electric connector 17 which penetrates the top wall portion 11a of the supporting bracket 11 and is fixed thereon by resilient engaging claws 19. The fuel gauge 16 and the fuel pump 12 are electrically connected to an automotive electronic control unit (not shown) through the electric connector 17.

Figure 2:
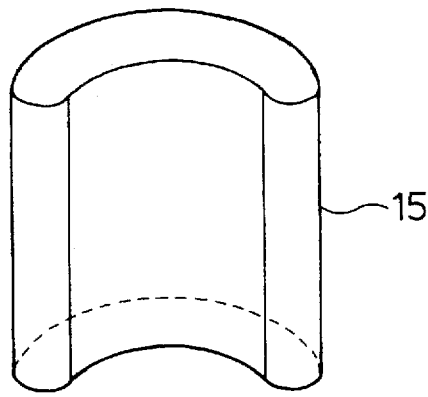
FIG. 2 is a perspective view illustrating a fuel filter used in the embodiment.
Figure 3:
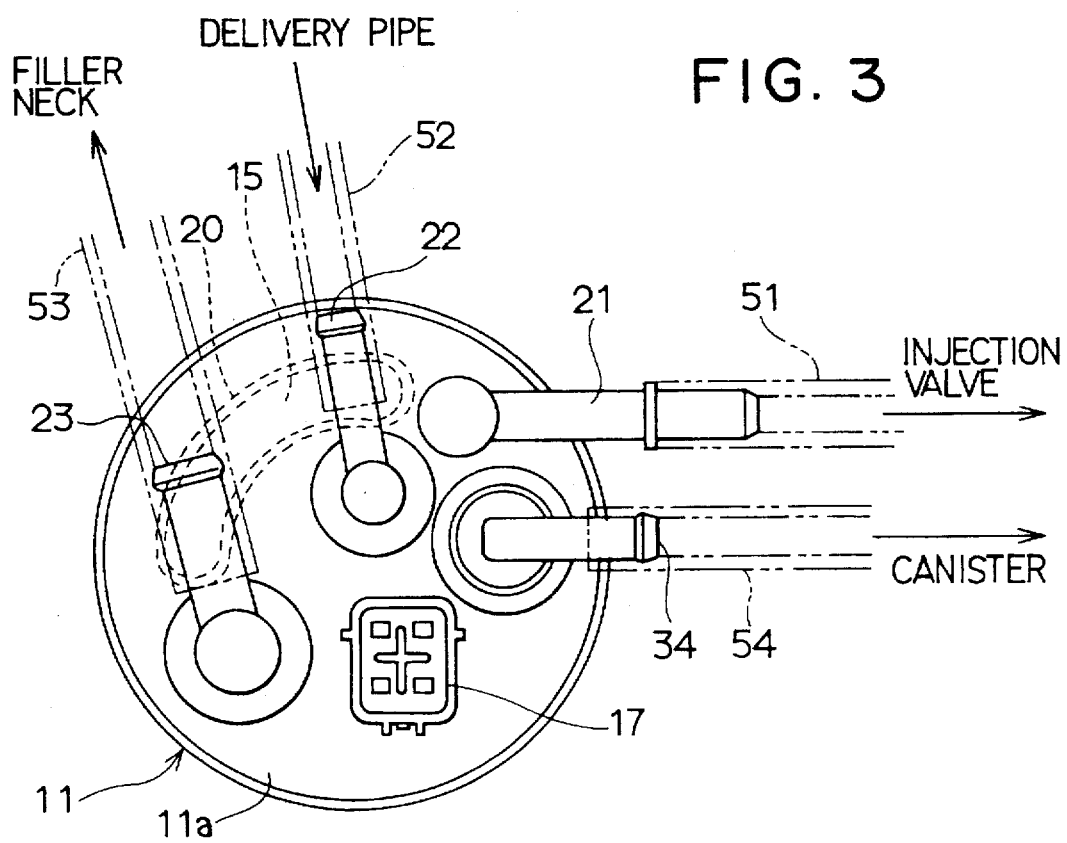
FIG. 3 is a top view illustrating the fuel leakage prevention system according to the embodiment.

As shown in FIGS. 2 and 3, the fuel filter 15 is formed to have a horizontal cross-section in an arcuate shape and is joined and mounted on an arcuate groove 20 formed at the bottom surface of the top wall portion 11a of the supporting bracket 11. An outlet of the fuel filter 15 communicates with a fuel discharging pipe 21 which is attached to the top wall portion 11a of the supporting bracket 11. Further, fuel discharged from the fuel pump 12 is filtered by the fuel filter 15 and is pressurized and supplied to a fuel injection valve (not shown) through a fuel pipe 51 from the fuel discharging pipe 21.

Mounted on the top wall portion 11a of the supporting bracket 11 are a connecting pipe 22 for returning fuel, which connects a return pipe 52 for returning excess fuel returned from a delivery pipe which distributes the fuel to fuel injection valves (not shown), and a connecting pipe 23 which connects a bent tube 53 to a tank neck (not shown) for performing air bleeding when gasoline is supplied to the fuel tank.

Figure 4:
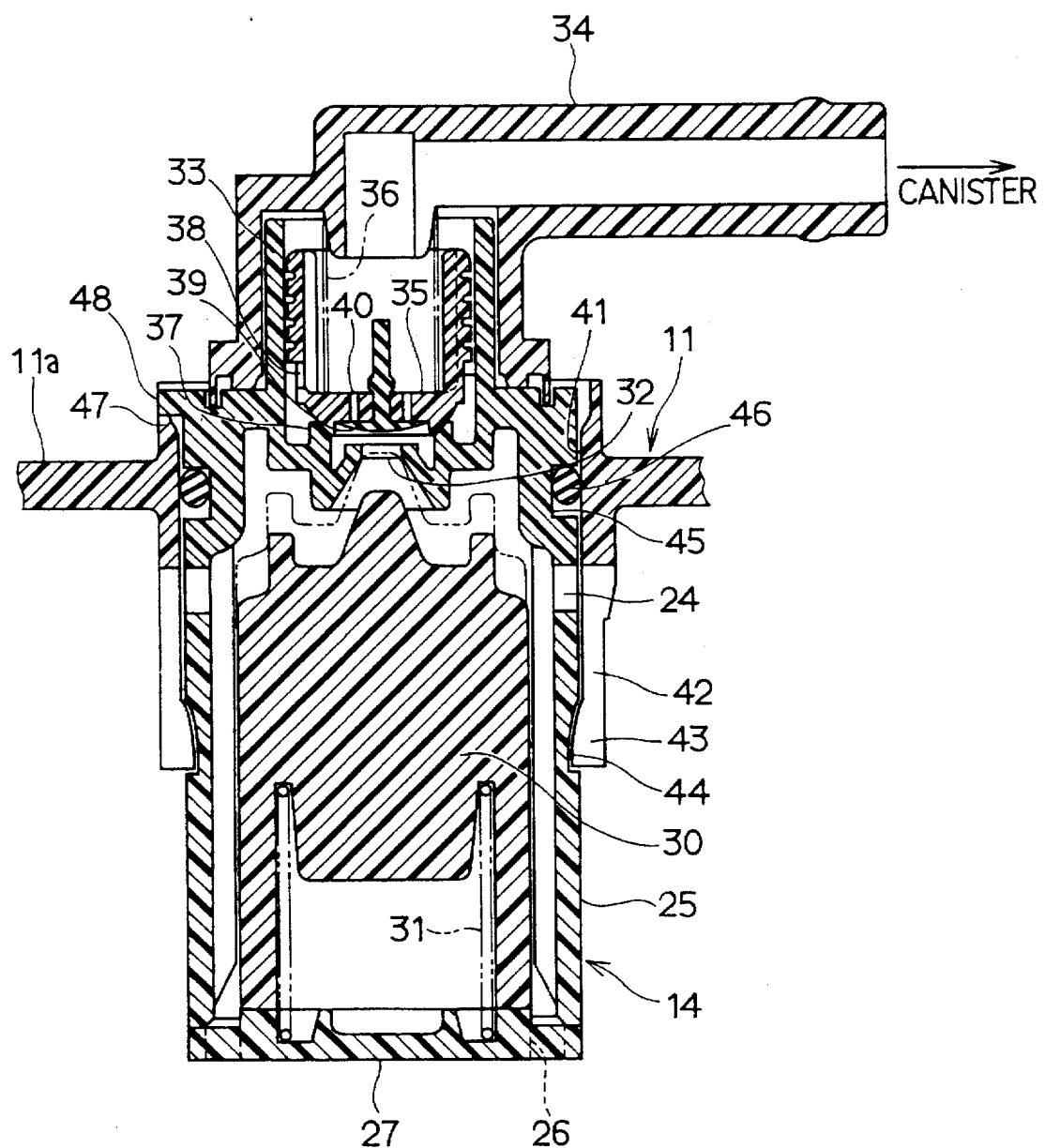
FIG. 4 is a front cross-sectional view illustrating the fuel leakage prevention system according to the embodiment.
Figure 5:
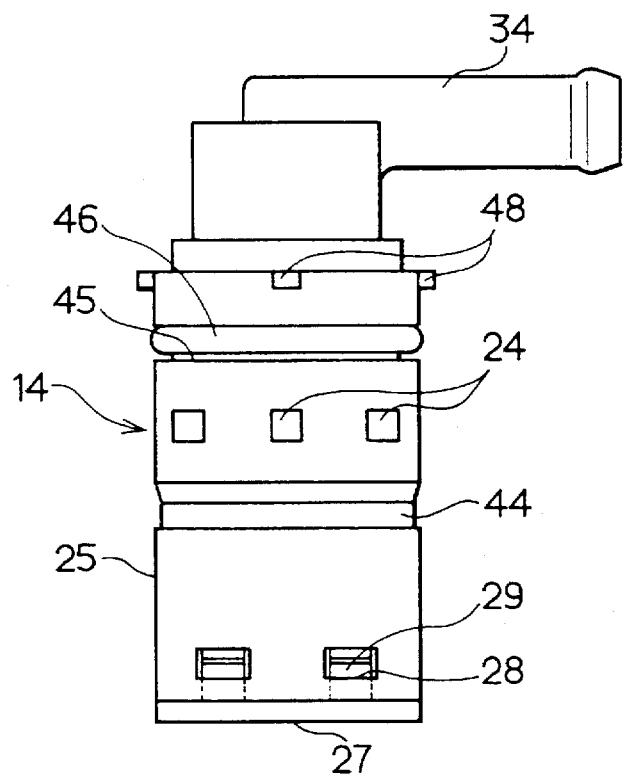
FIG. 5 is a front view illustrating a fuel leakage prevention valve unit used in the embodiment.

As best shown in FIG. 4, a cylindrical housing 25 constituting an outer case of the fuel leakage prevention valve unit 14 is integrally and rigidly formed by resin. A bottom surface opening of the housing 25 is closed with a bottom plate 27 having communication holes 26 for passing the fuel. Although not shown in detail in FIG. 4, resilient engaging claws 29 (FIG. 5) are integrally formed on a vertically extending outer periphery of the bottom plate 27 and resiliently engaged with engaging holes 28 (FIG. 5) formed on the lower portion of the housing 25, so that the bottom plate 27 is assembled to the bottom surface of the housing 25. Each engaging hole 28 is formed to have an opening area larger than each resilient engaging claw 29 to pass the fuel into the housing 25 through the clearance between the engaging hole 28 and the engaging claw 29.

A resin float-type valve 30 is movably received in the housing 25 in an axial (up-and-down) direction. A spring 31 for assisting buoyancy of the float-type valve 30 is disposed between the float-type valve 30 and the bottom plate 27. When the fuel is filled in the housing 25 through the holes 24 and 26 upon rolling over of the vehicle, the float-type valve 30 moves to a limit position by the buoyancy and the biasing force of the spring 31 as shown by the two-dotted chain line in FIG. 4. The float-type valve 30 thus closes an evaporation gas releasing outlet 32 formed on the top wall portion of the housing 25, so that the fuel leakage to a canister side can be prevented. A plurality of communication holes 24 (FIG. 5) for passing the evaporation gas in the fuel tank into the housing 25 are formed at a portion close to the top portion of the housing 25.

A cylindrical valve case portion 33 is formed at the top wall portion of the housing 25 to extend upward at an outside of the fuel tank. A resin connecting pipe 34 for connecting a canister pipe 54 (FIG. 3) is joined at the cylindrical valve case portion 33. A bottom end of the connecting pipe 34 is joined to the top wall portion of the housing 25 by welding, adhesion or the like. A canister (not shown) is connected to the connecting pipe 34 through the canister pipe 54.

A cylindrical pressure adjusting valve 35 having a bottom is movably received in the cylindrical valve case portion 33 and is biased downward by a spring 36. Therefore, when interior pressure of the fuel tank (interior pressure of the housing 25) is low due to no evaporation gas in the fuel tank, the pressure adjusting valve 35 contacts and presses a ring-shaped valve seat portion 37 formed on the periphery of the evaporation gas releasing outlet 32 to close the evaporation gas releasing outlet 32. When the interior pressure of the fuel tank (the interior pressure of the housing 25) rises due to the evaporation gas in the fuel tank, on the contrary, the pressure adjusting valve 35 is raised against the spring 36 due to the interior pressure, so that the evaporation gas releasing outlet 32 is opened. Therefore, the evaporation gas in the fuel tank flows to the canister through the communication hole 24, the housing 25, the evaporation gas releasing outlet 32, a penetrating hole 38 formed on an outer peripheral portion of the pressure adjusting valve 35, the connecting pipe 34 and the canister pipe 54. Thus, the evaporation gas releasing outlet 32, the penetrating hole 38 of the pressure adjusting valve 35 to the connecting pipe 34 provides an evaporation gas releasing passage from the fuel tank to the canister.

A rubber umbrella-type check valve 39 is mounted at a central portion of the pressure adjusting valve 35 from a bottom side and closes and opens air holes 40 formed on the pressure adjusting valve 35. Therefore, when the interior pressure in the fuel tank (interior pressure of the housing 25) becomes lower, the check valve 39 is resiliently deformed downward due to the lowered pressure to open the air hole 40 of the pressure adjusting valve 35. Air from the canister side is introduced into the fuel tank through the air holes 40, the evaporation gas releasing outlet 32, the housing 25 and the communication hole 24, so that the lowered pressure state in the fuel tank is released. Thus, after the negative pressure state in the fuel tank is released, the check valve 39 returns to the original position thereof and to close the air holes 40 again.

Figure 6:
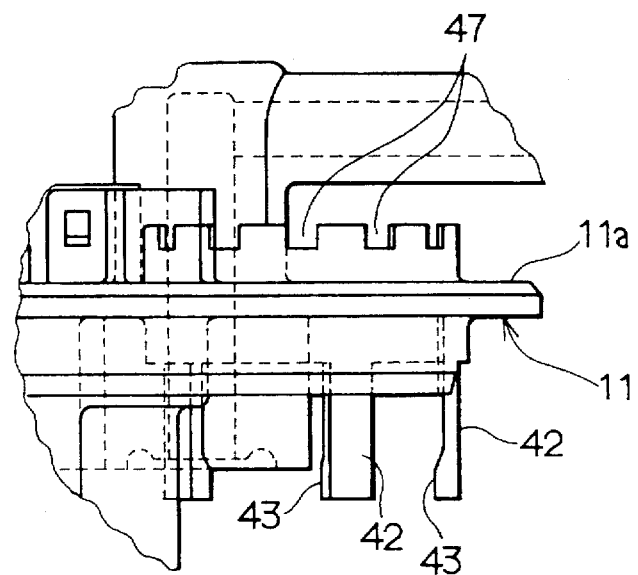
FIG. 6 is a partially expanded view illustrating an installation wall of a supporting bracket used in the embodiment.

Next, the fuel leakage prevention valve unit 14 is explained in detail. A short cylindrical installation wall 41 is formed to extend vertically from the top wall portion 11a of the supporting bracket 11. The diameter of the uppermost inner portion of the installation wall 41 is formed to be a little larger than the lower portion to insert the housing 25 therethrough readily. As shown in FIGS. 4 and 6, a plurality of resilient tongues 42 are integrally formed to extend downward from the top portion 11a. The tongues 42 are provided circumferentially at a constant angular interval. A convex portion 43 is integrally formed at an inner surface of the bottom end portion of each resilient tongue 42.

An annular groove 44 is formed all around the outer peripheral surface of the housing 25 at a vertical position which corresponds to the position of the convex portions 43. At the time of the assembling, the housing 25 is inserted into the installation wall 41 of the supporting bracket 11 from the top, thus expanding the resilient tongues 42 radially outwardly. The convex portion 43 of each resilient tongue 42 is finally joined with the groove 44 of the housing 25, so that the housing 25 is assembled to the installation wall 41 through a latch-engagement. In order to seal between the housing 25 and the inner peripheral surface of the installation wall 41, an O-ring 46 as a seal member is joined and mounted on a ring-shaped groove 45 formed at the top outer peripheral surface of the housing 25, so that the O-ring 46 contacts and presses the inner peripheral surface of the installation wall 41.

The groove 44 to which the convex portion 43 of respective resilient tongues 42 are joined is formed circumferentially all around the housing 25. Therefore, when the convex portion 43 of each resilient tongue 42 is joined to the groove 44, the housing 25 is only held undetachably from the installation wall 41. The rotational turning of the housing 25 in the circumferential direction cannot be restricted.

In the present embodiment, as shown in FIGS. 4 through 8, particularly in FIG. 7, a plurality of recesses 47 are formed vertically at the top end of the installation wall 41 of the supporting bracket 11 at a constant angular pitch (for example, 30°). Corresponding to the recesses 47, protrusions 48 are integrally formed on the outer periphery of the housing 25 at a constant angular pitch of, for example, 90° or 60°, that is, a pitch of integer multiplication of the pitch of the recess 47. Therefore, a joint position between the engaging protrusion 48 and the recess 47 can be selected as desired in steps at the time of assembling the housing 25 with the bracket 11. Thus, the housing 25 and hence the pipe 34 can be selectively directed in any direction circumferentially in steps of the pitch of the recess 47. When each engaging protrusion 48 is joined to any selected one of recesses 47, not only the rotational turning of the housing 25 is prevented but also the convex portion 43 of each resilient tongue 42 is joined to the groove 44. Thus, the housing 25 is held assembled to the installation wall 41 without dislocation vertically and circumferentially.

In this assembled state, because the resilient tongues 42 provided downward in the bracket 11 are in contact with or adjacent to the outer peripheral surface at the upper side of the housing 25, the communication hole 24 formed also at the upper side of the housing 25 is required not to be closed by the resilient tongues 42. Therefore, as shown in FIG. 9, the number of communication holes 24 formed on the upper side of the housing 25 is set to be more than the number of the resilient tongues 42 and the angular pitch of the communication hole 24 is made different from the angular pitch of the resilient tongue 42. Therefore, even though the housing 25 is assembled in any direction circumferentially, more than a half of the communication holes 24 can be exposed between the resilient tongues 42. Thus, the evaporation gas and fuel can assuredly flow into the housing 25 through the communication holes 24.

In the above-described embodiment, when the housing 25 of the fuel leakage prevention valve unit 14 is assembled into the installation wall 41 of the supporting bracket 11, the housing 25 is inserted into the installation wall 41 from the top thereof. Then, the circumferential direction of the housing 25 (direction of the connecting pipe 34) is determined by selectively joining the engaging protrusion 48 at the top end of the housing 25 with any one of recesses 47. Thus, the rotational turning of the housing 25 in the circumferential direction is prevented. At this time, when the engaging protrusion 48 is joined with the recess 47, the groove 44 of the housing 25 is joined with the convex portion 43 of each resilient tongue 42. Thus, the housing 25 is assembled undetachably and unrotatably in the installation wall 41.

In the present embodiment, the housing 25 of the fuel leakage prevention valve unit 14 can be fitted with the installation wall 41 of the supporting bracket 11 by the latch-engagement, so that assembling operation can be simplified.

Because the resilient tongues 42 formed integrally with the installation wall 41 is resiliently deformable, the groove 44 formed on the outer peripheral surface of the housing 25 is not required to be resiliently deformed. As a result, the groove 44 of the housing 25 need not be formed by cutting as in the conventional art and does not protrude inwardly toward the float-type valve 30 in the housing 25. Therefore, the groove 44 of the housing 25 does not interrupt the axial movement of the float-type valve 30 in the housing 25, so that the reliability of the valve closing operation of the fuel leakage prevention valve unit 14 can be improved.

Further, in the present embodiment, by forming the groove 44 annularly around the outer peripheral surface of the housing 25, the joining of the groove 44 on the outer peripheral surface of the housing 25 and the convex portion 43 of each resilient tongue 42 can be made at any circumferential position, so that the assembling work can be simplified. A plurality of recesses 47 are formed on the top of the installation wall 41 and the engaging protrusions 48 for selectively joining the plurality of recesses 47 are formed on the upper portion of the housing 25. Therefore, the housing 25 is assembled by properly selecting the angular pitch (for example, 30°) of the recess 47 so that the connecting pipe 34 may be directed as desired in steps in the radial direction. As a result, housing 25 does not have to be modified from type to type in correspondence with the required direction of the connecting pipe 34, so that the same housing 25 may be commonly used.

The present invention having been described should not be limited to the disclosed embodiment. The embodiment may be modified so that the groove 44 may be provided discontinuosly in the same number as or more than the number of resilient tongues 42 on the outer peripheral surface of the housing 25 and the convex portion 43 of each resilient tongue 42 is joined with one of the grooves 44. In this case, joining of the convex portion 43 of each resilient tongue 42 and the groove 44 prevents the rotational turning of the housing 25, and other rotational turning preventing mechanism such as the recesses 47 and the engaging protrusions 48 may be obviated. In this case, the relation between the angular pitch A of each resilient tongue 42 and the angular pitch B of each concave portion is set as A=B×N (N is an integer), so that the direction of the connecting pipe 34 of the housing 25 can be properly selected to assemble the housing 25.

Further, the groove-convex relation between the housing 25 and the resilient tongue 42 can be reversed. Similarly, the recess-protrusion relation in the rotational turning preventing mechanism can be reversed.

Both or one of the fuel filter 15 and the fuel gauge 16 can be fixed at a position other than the supporting bracket 11.

The pressure adjusting valve 35 can be omitted and instead a ball valve type relief valve mechanism can be provided on the fuel leakage prevention valve unit 14.

Still further, the present embodiment may be modified in many other ways without departing from the scope and the spirit of the invention. Such changes and modifications are to be understood as being included with the scope of the present invention as defined by the appended claims.

What is claimed is:

1. A fuel leakage prevention system having a fuel tank comprising:
    an installation wall shaped cylindrically and attached to the fuel tank, the installation wall having a resilient tongue with a first engagement part on an inner surface thereof;
    a cylindrical housing inserted into the installation wall and having a communication hole communicating an inside thereof with an inside of the fuel tank, the cylindrical housing having a second engagement part on an outer surface thereof for a latch-engagement with the first engagement part of the resilient tongue;
    a passage communicating the inside of the housing with an outside of the fuel tank; and
    a float-type valve disposed axially movably in the inside of the housing to open and close the passage.

2. A fuel leakage prevention system according to claim 1, wherein:
    the resilient tongue is provided to extend axially at a plurality of circumferential positions;
    the communication hole is formed at a plurality of circumferential positions which are displaced circumferentially from the resilient tongue; and
    the second engagement part is formed annularly around the outer surface of the housing.

3. A fuel leakage prevention system according to claim 1, wherein:
    the installation wall has a third engagement part at an upper portion thereof which is located outside the fuel tank;
    the cylindrical housing has a fourth engagement part at an upper part thereof which is located outside the fuel tank; and
    the third engagement part and the fourth engagement part are fitted to each other to restrict a rotational turning of the cylindrical housing in the installation wall.

4. A fuel leakage prevention system according to claim 1, wherein:
    the installation wall is fitted with a fuel pump and a fuel filter disposed in the fuel tank.

5. A fuel leakage prevention system according to claim 1, further comprising:
    a flange formed integrally with the insertion wall and attached to the fuel tank.

6. A fuel leakage prevention system according to claim 5, wherein:
    the resilient tongue is formed perpendicularly to the flange.

7. A fuel leakage prevention system according to claim 1, wherein:
    the resilient tongue is formed inside the fuel tank.

8. A fuel leakage prevention valve unit according to claim 7, wherein:
    the first engagement part of the resilient tongue is a convex protruding radially inward; and
    the second engagement part of the housing is an annular groove for receiving the convex therein.

9. A fuel leakage prevention system according to claim 3, wherein:
    the third engagement part is formed at a plurality of circumferential positions on the installation wall; and
    the fourth engagement part is formed at a plurality of circumferential positions on the cylindrical housing.

10. A fuel leakage prevention system according to claim 9, wherein:
    the number of the third engagement part and the number of the fourth engagement part are different from each other.

11. A fuel leakage prevention system having a fuel tank, a canister and a pipe connecting the fuel tank and the canister, comprising:
    an installation wall extending perpendicularly to a wall of the fuel tank and having a resilient tongue in the fuel tank;
    a rigid housing inserted into the installation wall and having an annular engagement part on an outer surface thereof for a latch-engagement with the resilient tongue;
    a valve disposed axially movably in the inside of the housing to open and close the pipe; and
    a turn preventing mechanism formed on the housing and the installation wall at an outside of the fuel tank.

12. A fuel leakage prevention system according to claim 11, wherein:
    the turn preventing mechanism includes a plurality of protrusions and recesses which are engageable with each other in steps of a predetermined angular pitch;
    the protrusions are formed on one of the installation wall and the rigid housing; and
    the recesses are formed on the other of the installation wall and the rigid housing.

13. A fuel leakage prevention system according to claim 11, wherein:
    the resilient tongue has a radially inwardly protruding part on an inner surface thereof and provided at a plurality of circumferential positions; and
    the annular engagement part includes a groove formed on the outer surface of the rigid housing annularly to receive the radially inwardly protruding part of each resilient tongue.

* * * * *